Oct. 11, 1960   W. A. LINTHICUM   2,955,867
PARACHUTE CARGO GROUND RELEASE
Filed July 23, 1957   2 Sheets-Sheet 1
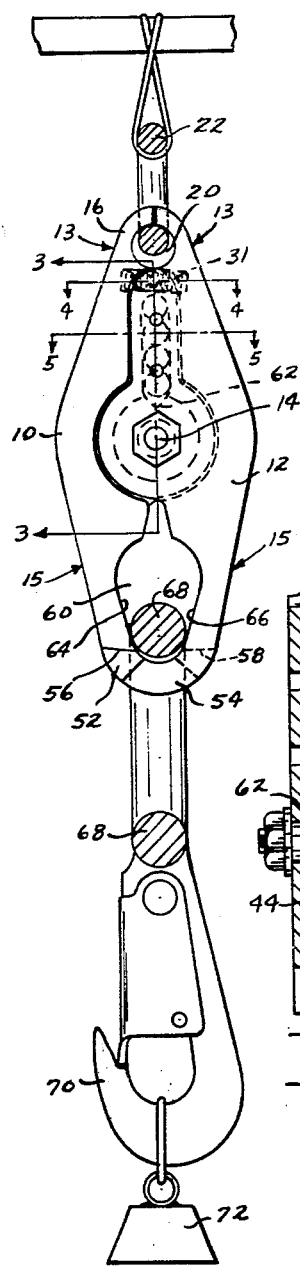
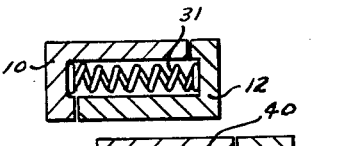
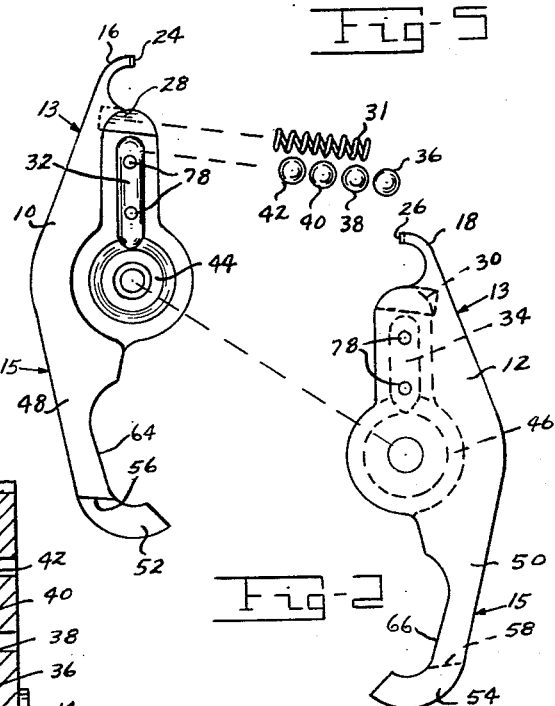
INVENTOR.
WILLIAM A. LINTHICUM
BY
ATTORNEYS Oct. 11, 1960  W. A. LINTHICUM  2,955,867
PARACHUTE CARGO GROUND RELEASE
Filed July 23, 1957  2 Sheets-Sheet 2

INVENTOR.
WILLIAM A. LINTHICUM
BY
ATTORNEYS

United States Patent Office 2,955,867
Patented Oct. 11, 1960

2,955,867

PARACHUTE CARGO GROUND RELEASE

William A. Linthicum, 317 Rosewood Ave., Springfield, Ohio

Filed July 23, 1957, Ser. No. 673,745

9 Claims. (Cl. 294—83)

(Granted under Title 35, U.S. Code (1952), sec. 266)

The invention described herein may be manufactured and used by or for the United States Government for governmental purposes without payment to me of any royalty thereon.

The present invention relates to a parachute cargo ground release and, more particularly, to a device for attaching a parachute to a load which attachment or connection is severed as soon as the load reaches the ground. Devices presently available for attaching parachute and load wherein it is desired to effect separation of the parachute and load at the instant of landing are characterized by complexity. This complexity of structure and operation adds to the expense of manufacture, requires more specialized skill in assembly, and increases the danger of failure.

Since the breaking of the connection between parachute and load is accomplished by relieving the connecting link of the weight of the load, as will be accomplished when the load lands, some means must be found to maintain the connection while the parachute and load are packed, i.e., before the parachute and load are dropped.

The object of the present invention is the provision of a device which will maintain connection between parachute and load during packing, during the storage interval before the drop, and during the drop, releasing only after the drop and when the load lands, remaining with the cargo after release.

Another object of the invention is to provide a device for the purpose above described which is sturdy, light in weight, dirt proof, and made of the fewest possible number of parts so that technicians are not required for its assembly and operation and, further, the danger of nonfunction is brought to a minimum.

A further object of the invention is the provision of a device wherein the weight of the load carried by a parachute provides a wedging action which strengthens the connecting capabilities of the device and maintains firm connections as long as the load is in the air and wherein the removal of the weight on the load occurring when the cargo touches ground, causes instant separation.

A further object of the invention is the provision of a parachute and load connection which is readied during packing of the parachute to a condition for maintaining firm connection during stowage interval before the drop and during the drop and is readied by the shocks attendant upon the opening of the parachute to a condition for instant release when the connection is freed from the weight of the load as it touches the ground.

A further object of the invention is the provision of a device capable of use on docks for releasing large loads upon landing impact.

A still further object of the invention is the provision of a connecting device for the above noted purpose which comprises mainly two identical elements, which can be made from one mold in quantity, thus reducing expense and producing a device which is simple and sure in construction, easily assembled and one with a minimum of nonfunction hazard.

In the drawing:

Fig. 1 is a side view of the device showing it supported, as by a parachute, and showing the load attached.

Fig. 2 is an exploded view.

Fig. 3 is a fragmentary longitudinal cross sectional view of the device taken on the line 3—3 of Fig. 1.

Fig. 4 is a horizontal cross sectional view taken on the line 4—4 of Fig. 1.

Fig. 5 is a horizontal cross section taken on the line 5—5 of Fig. 1.

Figure 6:
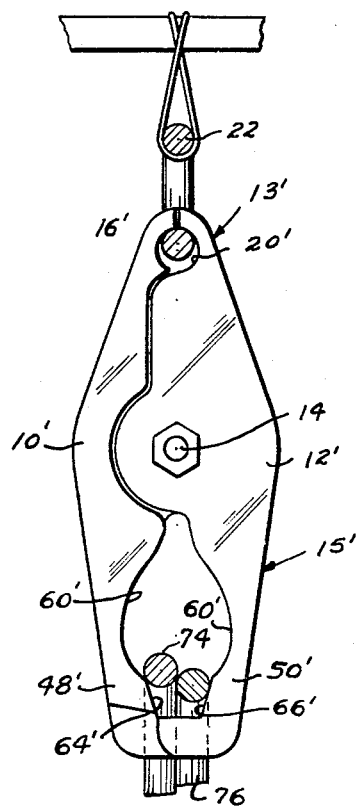
Fig. 6 is a side elevational view of the device shown in a modified form.

Referring more in detail to the drawing, the mechanism for releasing the cargo load from the parachute consists of a link device formed of two identical halves 10 and 12. These halves are faced together and pivoted at their midsections by a bolt 14 or other suitable means. Thus, upper segments 13 and lower segments 15 are pivoted to move inversely with respect to each other, i.e., when segments 15 move away from each other the segments 13 move toward each other.

Each upper segment 13 is provided with a half eye 16 and together they form an eye 20. By mechanisms later described, the eye 20 may be opened and closed and is attachable to a parachute by means of a ring 22 or other similar device. For stabilizing purposes, the mating surfaces which close the eye 20 have complementary interfitting shoulder surfaces 24 and 26.

Each half portion is provided with a spring recess indicated at 28 and 30. These recesses, when fitted together, form a recess and spring seats for a compression spring 31 whose bias presses the halves apart in the region above the pivot 14. Below the recesses 28 and 30 are vertically extending mating cavities or channels 32 and 34, which form a vertical raceway 32—34. Four steel balls, 36, 38, 40 and 42 are accommodated in this raceway, and fit to a tolerance sufficiently close to allow movement or rolling in the race only when the channels 32 and 34 are perfectly mated. When not perfectly mated, or under stress of very slight shearing movement, binding occurs, and the balls are held tightly in the race 32—34. The bias of the spring 31 is in a direction to apply this scissors or binding action. Thus, when the balls are in the recess 32, and no other force is exerted except that of the spring 31, the balls cannot escape or drop and the eye 20 will be held closed. When the balls are released and drop by means later described, the spring will push the halves farther apart and open the eye 20.

The axially or vertically extending ball race 32—34 communicates with a circular race 44—46 formed of circular complementary half channels 44 and 46 concentric to the pivot 14. When freed by means later described, the balls drop out of the race 32—34 into the circular race 44—46. The halves of the device fit together to form protection for the operating parts from dust and dirt.

The lower segments 15 form a sort of scissors handle, and are cut away to half thicknesses at their lower ends, forming slidably engaging sections 52 and 54 and shoulders 56 and 58, which limit the movement of the members 15 toward each other. An eye 60 is thus formed and a load ring 68 is retained therein. This ring is inserted before the halves are bolted together. After bolting the halves of the link together, the eye 60 may change in contour and size, due to the play allowed between the reduced-thickness portions 52 and 54, but the amount of play is limited by the shoulders 52 and 54 and it is never sufficient to allow opening of the eye 60. There is sufficient movement possible, however, limited by the shoulders 52 and 54 to open and close the eye 20.

The pivot bolt 14 is provided with a cup or depressed area 62, which is positioned so that it forms a seat directly below the axial race 32, and seats the balls, either momentarily, or for a longer interval of time, as they drop from the race 32—34 into the race 44—46.

The wall surfaces 64 and 66 of the eye 60 converge downwardly to form wedge surfaces. The ring 68 (see Fig. 1) has a conventional load securing latch hook 70 adapted to receive and hold securely a load 72. This load may be a dead cargo such as mail, provisions, war paraphernalia, or any object that it is desired to drop by parachute, or it may be attached to the harness of a live parachutist.

In the device shown in Fig 1, the ring 68 is of larger diameter than the lower extremity of the eye opening 60, so that the weight of the load 72 during the drop applies wedging action to the wedge surfaces 64 and 66. This wedging action operates to hold the eye 20 closed. In this position the halves of the axial race 32—34 are aligned.

In Fig. 6, there is shown a modified form of the eye 60. In this modification, the configuration of the eye identified in Fig. 6 as 60', is such that two D-rings 74 can be accommodated between the wedging surfaces 64' and 66'. The combined diameters of the D-rings 74 exceeds the width between any opposed points on these wedging surfaces so that neither may descend to the base of the slot 76 and must, therefore, always provide wedging action on the eye 60' while the load is applied to the D-rings 74. The formation of the lower eye 60' and wedging surfaces 64' and 66' is the only respect in which this modification differs from the device of Figs. 1–5. The half sections 10' and 12' are pivoted at 14. Each upper segment 13' is provided with a half eye 16', and together they form the eye 20' which is identical with eye 20 and capable of engaging or being released from engagement with the ring 22 in the same manner.

The area of the device, which forms the wall casing of the vertical raceway 32 and 34, is provided with window openings 78, which provide visual knowledge of the position of the balls 36, 38, 40 and 42 in the vertical channels.

The operation of the device is as follows:

The load carrying rings 68 or D-rings 74 as the case may be, are adjusted in the eye 60 or 60' before the half portions 10 and 12 are bolted together.

When the parachute and load connecting link are prepared for packing, the device, with the ring 68 in place, is held upright, squeezed in the region between the pivot and the eye 20 to overcome the bias as the spring 31 and allow the balls, if they are in the raceway 32—34 to roll out of it into the race 44—46. When the last ball is out of the race, the holding pressure is relieved and the spring 31 is no longer impeded. The expansion force of the spring 31 opens the eye 20 to receive the ring 22. After this attachment has been made, the device is inverted and squeezed again in the area adjacent the eye 20 to overcome the bias of the spring 31 so that the segments of the axial race 32—34 coincide, and the balls will roll out of the circular race 44—46 back into the race 32—34. The squeezing pressure is then released and the balls are held in the raceway by the bias of the spring 31. Visual knowledge of the location of the balls is obtained through windows 78. The bias of the spring 31 takes over, causing sufficient binding action on the balls between the channels to maintain the balls 36, 38, 40 and 42 in the race 32—34. As long as a single ball remains, the eye 20 remains securely closed.

The balls remain thus until the drop is made. As the load descends, the load weight, wedging against surfaces 64 and 66, or 64' and 66', acts as a second means to hold the eye 20 closed.

As is well known, opening shock of a parachute occurs in stages. The first shock provides an upward pulling force, which overcomes the downward force of the weight of the load sufficiently to overcome the bias of the spring 31 in the instant device, allowing the segments of the raceway 32—34 to mesh momentarily, and all of the balls to drop downwardly. The lower ball 36 is caught in the cupped depression 62, see Fig. 3. A further bounce, as the second stage of the parachute opening occurs, provides release for the balls again. The ball 36, which is seated in the depression 62, drops into the raceway 44—46 and the ball 38, next above, seats into the depression 62. Thus, successively and in successive stages of parachute opening, the balls leave the chamber or raceway 32—34 and all fall freely into the raceway 44—46.

The link mechanism is now freed from the restraint and binding action of the balls 36, 38, 40 and 42. The eye 20 is held closed only by the weight of the load, and the link is readied to open when the load weight is taken away. The eye 20 is held closed only as long as the weight of the load remains, and is opened instantaneously by the force of spring 31 when the weight of the load is removed, as when the load makes contact with the ground.

While the invention is shown and described in connection with one form for illustrative, rather than restrictive purposes, it is obvious that changes and modifications may be made by those skilled in the art without departing from the scope and spirit of the invention as defined in the accompanying claims.

I claim:

1. A link mechanism for maintaining connection between a parachute and load during packing, stowage interval, and readying said link during the drop interval for severing said connection upon instant of landing, comprising a pair of elongated half sections positioned facing each other and pivoted together at overlapping midsections, a half eye on each of said half sections together forming an upper eye above said pivot, attachable to a parachute and capable of being opened and closed by pivotal movement of said half sections, a downwardly extending half eye element on each of said half sections below said pivot, overlapping and slidably engaging end sections on each of said half eye elements to form a lower expandable eye capable of receiving a load carrying ring, an axial raceway positioned between said pivot and said eye and formed of mating half channels in the overlapping portions of said half sections, a circular raceway formed also of mating half channels in said half sections, having its center at the point of said pivot, and communicating with said axial raceway, a bolt extending through said half sections and forming the pivotal connection therebetween, said bolt extending normally to and through the plane of said axial and said circular raceways, said bolt being provided with a cupped depression positioned directly below the open lower end of said axial raceway, balls movable in said raceways and movable into and out of said axial raceway when said half channels of said axial raceway are perfectly mated, and bound immovably in said raceway when said half channels are subjected to shearing force, said balls dropping one by one successively out of said axial raceway into said cupped depression, released one by one successively by the upward shock force of the staged opening of the parachute, biasing means to bias said mated channels of said axial raceway to mismated condition and bind said balls in said raceway to hold said eye closed, said spring means operating further to open said eye when all of the balls have been freed by parachute opening shock and have dropped from said raceway.

2. A device for attaching a parachute to a cargo and releasing the parachute from the cargo upon impact of the cargo with the ground comprising a pair of identical half sections, each half section comprising an upper portion, a lower portion and overlapping mid-portions, a pivot pin securing said half sections together in the region of the overlapping mid-portions, a half eye on each of said upper half sections together forming an openable eye for attachment to a parachute, said lower portions forming together a lower eye capable of attachment to a cargo, said half sections being capable of movement about said pivot for opening and closing of said upper eye upon inverse movement of said lower portions, half channels in each of said overlapping mid-portions, said half channels being capable of mating to form an axial raceway extending upwardly above said pivot, and a circular raceway communicating with said axial raceway extending around said pivot and concentric with it, removable means for maintaining said upper eye in closed position, said means comprising balls movable into and out of said communicating raceways, a compression spring operating between the two upper portions and biased to cause sufficient misalignment of the channels of said axial raceway to cause binding action between said balls and said channels to retain said balls in said axial raceway, means located below the pivot for bringing the half channels of said axial raceway into alignment to allow said balls to drop by gravity from said axial raceway and enter said circular raceway.

3. A link mechanism for maintaining connection between parachute and load during packing, stowage interval and drop interval, and severing said connection upon instant of landing, said link comprising a pair of elongated identical reversed and mated half sections, overlapping areas in the mid-portions of said half sections, a pivot connecting said half sections together in the region of their mid-portions, complementary half eye portions in each of said half sections located above said pivot and together forming an openable upper eye above said pivot, said upper eye being releasably attachable to a parachute, complementary half eye portions in each half section located below said pivot, said last named half eye portions forming together a complete lower eye capable of receiving a load ring, complementary and facing wedge surfaces on said last named half eye portions, a load ring actuated by the weight of a load carried thereby to provide wedging action on said wedge surfaces to move said half sections away from each other below the pivot and toward each other above said pivot, thus maintaining said upper eye closed so long as the weight of the load is carried by said load ring, delaying means for preventing opening of said upper eye during packing, stowage interval and drop interval, biasing means located above said pivot to open said upper eye when the weight of said load is removed from said load ring, as when the load touches ground.

4. A link mechanism for maintaining connection between parachute and load during packing, stowage interval and drop interval, and severing said connection instantaneously upon landing, said mechanism comprising a pair of identical half sections positioned facing each other, reduced thickness overlapping midsections on each half section, a pivot located in the area of said overlapping midsections connecting said half sections for pivotal movement with respect to each other, said half sections forming an upper eye above said pivot attachable to a parachute and capable of being opened and closed by movement of the lower half sections about the pivot, said half sections forming also an expandable lower eye below said pivot capable of receiving a load ring, communicating axial and circular ball races formed of mating channels on said overlapping mid-sections, said axial raceway being located above said pivot and said circular raceway being located concentrically of said pivot, balls positioned in said races capable of gravitational movement from one race to the other, a spring providing bias to mismate said channels and bind said balls in said axial raceway to prevent pivotal movement of said half sections and hold said upper eye closed as long as any single ball remains in said axial raceway, and to open said upper eye when said balls have been successively removed from said axial raceway by the momentary and successive mating of said channels under stress of the staged opening shocks of the parachute, facing wedge surfaces on the lower eye, reduced thickness elements on said half sections located at the lower portion of said lower eye slidable with respect to each other for allowing pivotal movement of said half sections for opening and closing said upper eye, said wedging surfaces receiving said load carrying ring and interacting therewith to hold said upper eye closed so long as said load carrying ring sustains the weight of said load, said spring opening said eye instantly when the weight of said load is removed, as when said load touches ground.

5. A link mechanism comprising a pair of elongated elements, overlapping areas in the region of their mid-sections, a pivot located in the overlapping midsections and attaching said elongated elements for allowing oppositely directed movement of said elements above and below said pivot, said elongated elements forming an upper openable eye above said pivot for attachment to a parachute and a lower expandable eye for attachment to a load, means for opening said upper eye, means for delaying opening of said upper eye during packing and stowage interval and drop interval, means independent of said second named means for holding said upper eye closed during the drop interval, said last named means being dependent for its action upon the imposed weight of the load, means for removing said delaying means from operating position for holding said upper eye closed, said last named means being operated momentarily and successively by the forces operating on said link during the drop to relieve said independent means from the weight of the load, to ready said link for opening of said upper eye when the load makes contact with the ground.

6. A link mechanism for maintaining attachment of a load to a parachute during packing, stowage interval and drop interval and finally severing said load and parachute upon instant of load-ground contact, said link comprising a pair of elongated elements, overlapping mid-sections on said elements, a pivot securing said elements together in the region of their overlapping mid-sections for allowing oppositely directed movement of said elements above and below said pivot, said elongated elements forming an openable eye above said pivot for securing said link to a parachute, said elements also forming an expandable eye below said pivot for securing said link to a load carrying ring, means for opening said upper eye, delaying means for delaying said opening during predrop and drop interval, wedging means located below said pivot for wedging said elements in a direction away from each other and maintaining said upper eye closed, said wedging means held active by the weight of said load on said load carrying ring and rendered inactive by the removal of said weight, said delaying means comprising intermediate binding means operating in the overlapping areas of said elements to prevent pivotal movement of said elements, thus holding said upper eye closed during packing, stowage and drop interval, said intermediate binding means held in binding position by said wedging means, said means for opening the upper eye comprising spring means for overcoming the binding action of said intermediate binding means in successive steps as the load ring is relieved of the weight of the load by the successive shock of staged opening of said parachute, said spring means also opening said upper eye for severing said load and parachute when said intermediate binding means has been overcome and said wedging action has been removed by relieving the load ring from the weight of the load when the load touches the ground.

7. In a link mechanism for maintaining connection between a parachute and load during packing, stowage interval and drop interval, means for severing said connection instantaneously when said load touches ground comprising, a pair of elongated elements, overlapping areas in the mid-sections of said elements, a pivot bolt pivoting said elements together in the region of said overlapping areas for allowing oppositely directed movement of said elements above and below said pivot, a half eye portion on each of said elements above said pivot forming together an openable eye attachable to a parachute, a downwardly extending half eye element on each of said half sections below said pivot, overlapping and slidably engaging end sections on each of said last named half eye elements to form a lower expandable eye capable of receiving a load carrying ring, said upper eye being closed when said lower eye is expanded, a first means and a second means for holding said upper eye closed to maintain connection between said link and said parachute, said first means comprising a wedging element for expanding said lower eye, said wedging element being dependent for its wedging action upon the imposed weight of the load, and inoperative for expanding said lower eye when the weight of the load is removed, said second means comprising axially extending channels in said overlapping areas of said elongated elements capable of mating to form an axially extending raceway, balls capable of moving into and out of said raceway when said channels are perfectly mated, and of being held immovable in said channels by binding action when said channels are mismated, spring biasing means independent of said first means for biasing said upper half eye portions away from each other for mismating said channels to bind said balls in said raceway, and further, to open said upper eye when said balls have been removed from said raceway, said first means being rendered inoperative in momentary and successive stages by the successive shocks of the staged opening of said parachute which shocks allow said balls successively to leave said axial raceway, leaving said eye held closed by said first means along, said first means being rendered inoperative upon load-ground contact.

8. A link mechanism for maintaining connection between a parachute and load during packing, stowage interval and drop interval, and severing said connection instantaneously when said load touches ground comprising, a pair of elongated elements, overlapping areas in the mid-sections of said elements, a pivot bolt pivoting said elements together in the region of said overlapping areas allowing oppositely directed movement of said elements above and below said pivot, oppositely facing half eye portions on each of said elements above said pivot forming together an openable eye attachable to a parachute, a downwardly extending half eye element on each of said half sections below said pivot, overlapping and slidably engaging end sections on each of said last named half eye elements to form a lower expandable eye capable of receiving a load carrying ring, said upper eye being closed when said lower eye is expanded, a first means and a second means for holding said upper eye closed to maintain connection between said link and said parachute, said first means comprising a wedging element for expanding said lower eye, said wedging element being dependent for its wedging action upon the imposed weight of the load, and inoperative for expanding said lower eye when the weight of the load is removed, said second means comprising axially extending channels in said overlapping areas of said elongated elements capable of mating to form an axially extending raceway, balls capable of moving into and out of said raceway when said channels are perfectly mated, and of being held immovable in said channels by binding action when said channels are mismated, circular and complementary mating channels in said elongated elements forming a circular raceway concentric with said pivot, communicating with said axial raceway to receive said balls therefrom, spring biasing means independent of said first means for biasing said upper half eye portions away from each other for mismating said channels to bind said balls in said raceway, and further, to open said upper eye when said balls have been removed from said raceway, and first means being rendered inoperative in momentary and successive stages by the successive shocks of the staged opening of said parachute which shocks allow said balls successively to leave said axial raceway, leaving said eye held closed by said first means alone, said first means being rendered inoperative upon load-ground contact.

9. A device according to claim 8 wherein a depressed area is provided in said pivot bolt directly in line with and below said axial raceway and forming a seat for temporary seating of individual ones of said balls, said balls being retained in said axial raceway by binding stress applied to said axial raceway by said spring biasing means, and allowed one by one to seat on said pivot bolt and thereafter enter said circular raceway as successive shock impacts of the opening of the parachute overcome the bias of said spring to allow momentary and successive mating of the channels forming said axial raceway.

No references cited.